Figure 1:
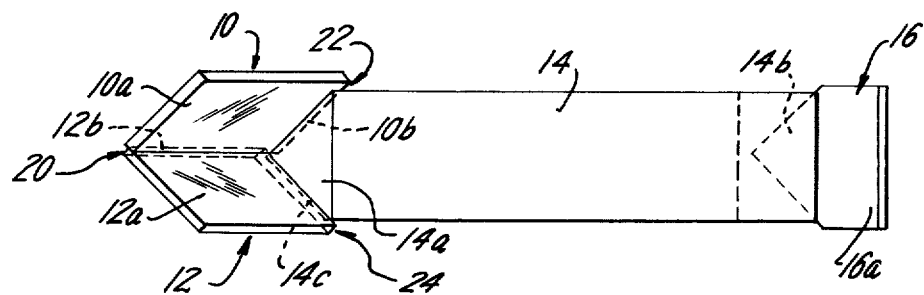

United States Patent [19]
Lipkins

[11] 3,936,194
[45] Feb. 3, 1976

[54] METHOD AND DEVICE FOR ASSEMBLING HOLLOW RETROREFLECTORS

[76] Inventor: Morton S. Lipkins, 3 Nemeth St., Malverne, N.Y. 11565

[22] Filed: May 31, 1974

[21] Appl. No.: 475,133

[52] U.S. Cl. ................ 356/153; 350/102; 350/300
[51] Int. Cl.² ....................................... G01B 11/26
[58] Field of Search ........ 356/138, 153, 106 R, 110; 350/102, 300

[56] References Cited
UNITED STATES PATENTS

| | | | |
|---|---|---|---|
| 3,158,674 | 11/1964 | Woodson | 356/106 R |
| 3,734,627 | 5/1973 | Edwards | 356/153 |

*Primary Examiner*—Edward S. Bauer

[57] ABSTRACT

Very large retroreflectors, especially retroreflectors designed for laterally transferring and reversely directing the incoming beam along a parallel but offset outgoing path, are checked for accurate perpendicularity of their reflecting faces. First and second flat, laterally displaced and opposite-facing test reflectors are disposed between an error detector and the retroreflector. To special advantage, the test reflectors are coplanar parts of two pates that are united face-to-face. One test reflector is used to determine its own perpendicularity to the error detector and thereby to determine the perpendicularity of the plane of the second test reflector to the axis of an autocollimator or other error detector. The autocollimator directs its beam toward one end of the retroreflector for lateral transfer and redirection along a reverse path offset from the incoming beam. The second test reflector returns the outgoing beam along what should be an identical but reverse path, to the autocollimator.

8 Claims, 3 Drawing Figures

U.S. Patent  February 3, 1976  3,936,194

METHOD AND DEVICE FOR ASSEMBLING HOLLOW RETROREFLECTORS

FIELD OF THE INVENTION

This invention relates to a method and a device for checking and guiding the adjustment of retroreflectors.

BACKGROUND OF THE INVENTION

Retroreflectors comprise three reflecting flat faces in mutually perpendicular planes, related so that an incoming beam is redirected along a reverse path. The resolution of a retroreflector suffers in case its reflecting faces are not exactly mutually perpendicular. Hollow retroreflectors have separate reflecting faces, and these can be adjusted in relation to each other during assembly. As error detector is used to check the accuracy of the assembly. The error detector directs its beam toward the retroreflector, and the resulting image(s) produced in the error detector is used to guide the adjustment of the parts.

In case of very large retroreflectors, especially those designed to offset the path of the outgoing reflected beam in relation to the incoming beam, the aperture of the error detector may be inadequate.

SUMMARY OF THE INVENTION

The invention provides a novel method of checking the right-angled relationship of the parts of retroreflectors, especially parts of a lateral transfer retroreflector. In this method, the beam of an autocollimator or an interferometer or other error detector is directed toward one end of the device to be tested. A first flat test reflector is disposed to intercept part of the autocollimator beam. A second flat test reflector is disposed across the opposite end of the lateral transfer retroreflector. The test reflectors have flat extensions of their reflecting areas, and those extensions are united, face-to-face. The part of the beam of the error detector that is reflected by the first test reflector is used to establish its perpendicularity with respect to the error detector, and in this way to establish perpendicularity of the plane of the second test reflector with respect to the axis of the error detector.

The beam of the error detector is directed toward one end of the lateral transfer retroreflector and is reflected laterally and then reversely, to leave the device toward the second test reflector. The outgoing beam is returned by the second test reflector to reenter the device for lateral transfer and reverse reflection toward the error detector. Any lack of mutual perpendicularity of all of the three flat reflectors of the lateral transfer retroreflector is readily detected. It can thus be corrected by adjustment during assembly of the parts, and the quality of resolution of the lateral transfer retroreflector due to any warping or other distortions of its three flat reflectors can also be observed. The aperture of the error detector can be quite small as compared with the distance between the incoming beam and the laterally offset and reflected outgoing beam.

ILLUSTRATIVE EMBODIMENT

Figure 2:
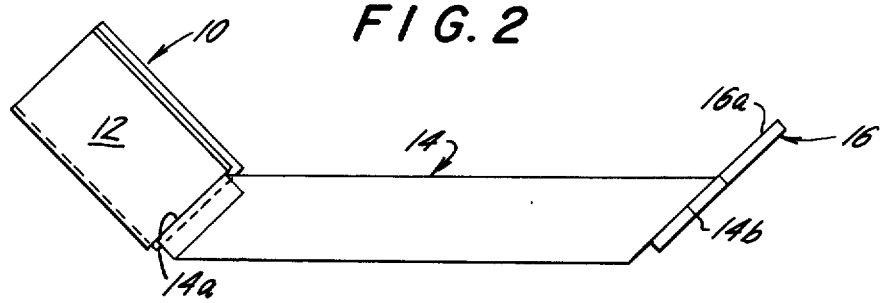
Figure 3:
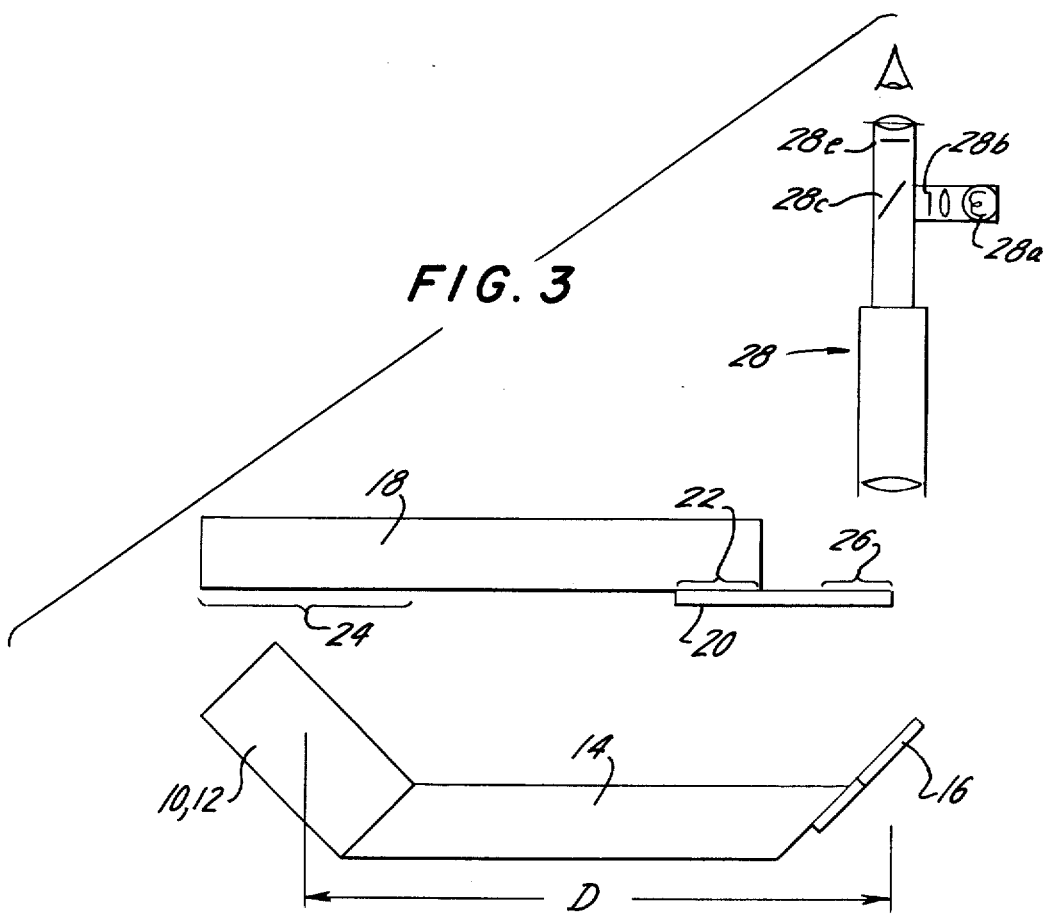

An illustrative embodiment of the invention in its various aspects is shown in the accompanying drawings, wherein:

FIGS. 1 and 2 are a top plan view and a lateral view, respectively, of a novel lateral transfer retroreflector incorporating features of the invention; and FIG. 3 is an illustration of a lateral transfer retroreflector together with equipment utilized in a novel method of testing that device.

Before describing the method and apparatus used in assembling lateral transfer retroreflectors, a brief description is given of such a retroreflector which can be adjusted as need is indicated by test devices. FIGS. 1 and 2 show a lateral transfer retroreflector including a first flat reflector 10 and a second flat reflector 12 united to one slant end of a central member 14. A third flat reflector 16 is united to the opposite slant end of member 14. The three flat reflectors have reflecting faces that are optically flat and rendered reflective fully or in a substantial degree as by an aluminized coating. The first and second reflectors 10 and 12 have a right angle between their reflecting faces, thus constituting a hollow roof reflector. The third flat reflector has its reflecting face disposed at right angles to each of the first and second flat reflectors.

An incoming ray that enters or is incident to either end of the device is offset laterally and reflected along an exit path parallel to the path of the incident ray, but offset by a relative distance D. This characteristic is independent of the exact orientation of the device in relation to the incident ray. For ideal performance, the reflecting faces 10a, 12a and 16a of reflectors 10, 12 and 16 must be optically flat and precisely at right angles to each other.

As seen, a marginal portion 10b of face 10a overlaps a marginal portion of a lateral surface of central member 14 adjacent to its end face 14a. The transverse cross-section of member 14 is a rectangle, but a cut triangular end provides a lateral surface engaged by plate portion 10b. Flat reflector 12 has one edge in abutment with end face 14a at area 14c. An edge of flat reflector 10 abuts against the face 12a at area 12b of reflector 12. Third flat reflector 16 is united to central member 14 with its flat face 16a against second slant face 14b of the central member 14.

End faces 14a and 14b are approximately parallel, and they both slant at 45°, for example, in relation to the longitudinal top and bottom surfaces of central member 14.

The orientation of the reflecting face 16a of plate 16 is fixed in relation to end face 14b of member 14. However, the faces of both plates 10 and 12 can readily be adjusted to be perpendicular to plate 16 and to each other. Thus, plate 10 can swing arcuately about its margin 10b. Its edge abutting plate 12 sweeps across the face of plate 12 for adjusting faces 10a and 16a into mutual perpendicularity. Plate 12 can swing about its margin 12b, its edge which abuts end face 14a sweeping across the latter for adjusting faces 10a and 12a into mutual perpendicularity. End face 14a can be swung about the area 14c relative to the roof reflector, for adjusting faces 12a and 16a into mutual perpendicularity.

The construction briefly described above is reserved for a companion patent application of mine copending herewith. Its reflecting plates are adapted to be adjusted readily in relation to each other.

The reflecting plates or faces of this or another hollow retroreflector are adjustable under surveillance of an autocollimator, an interferometer or other error detector. However, here an error detector having an enormous aperture would be needed to encompass the laterally offset plate 16 and its roof reflector 10, 12. Stated otherwise, the offset distance D between the incoming and outgoing beams of the retroreflector is enormous compared with the aperture of the error detector. The following device and method are useful in assembling and adjusting a lateral transfer retroreflector, as well as large retroreflectors, without resort to an error detector having an unusually wide aperture.

Two plates 18 and 20 are united face-to-face over a limited common area 22. Their entire faces of which common area 22 is a part are made very accurately flat. They are united as by "optical contacting" of contacting faces at area 22, without interposing cement between them. Plate 18 has a flat reflecting area 24 facing roof reflector 10, 12. Plate 20 has a flat reflecting area 26 which is thus coplanar with reflecting area 24 but facing in the opposite direction, as rigorously as the flatness of the lower face of plate 18 and the upper face of plate 20.

An error detector 28 is used to check the accuracy of adjustment of the retroreflector. Other forms of error detector could be used such as an interferometer. Autocollimator 28, as shown diagrammatically, includes a light source 28a and an optical system not shown in detail for forming and directing a beam past target 28b, and to half-silvered mirror 28c, and downward. The light returning to the autocollimator from a test reflector and from the retroreflector should each form an image at the same part of reticle 28e.

The parts of the retroreflector are adjusted in a suitable jig, to be close to their required condition of mutual perpendicularity, and disposed under the autocollimator. Reflector unit 24, 26 is disposed above the assembled parts 10, 12, 14 and 16 of the retroreflector. A sufficient portion of the field of the autocollimator is occupied by reflector 26 of unit 24, 26 to enable adjustment of reflector 26 to produce an image of the target at reticle 28e. This adjustment serves to establish the plane of reflector 24 as perpendicular to the axis of the autocollimator.

The portion of the autocollimator beam that is not intercepted by reflector 26 is directed downward toward reflector 16, as the incoming beam. This beam is deflected laterally to roof reflector 10, 12, and it is redirected upward as an outgoing beam. This beam is returned to the retroreflector by reflector 24 as an incoming beam. The returning beam is reflected laterally by roof reflector 10, 12 to reflector 16, and it is then reflected upward into the autocollimator. With all the parts 10, 12, 16 in proper relative adjustment, a single image of the target appears at reticle 28e. Otherwise, multiple images appear.

Guided by the autocollimator, the technician can adjust parts 10, 12, 14, 16 until the desired single image is realized. Such single image appears at the same place in the reticle as the image of the target produced by test reflector 26. The parts are united by a suitable cement while held in this adjustment. The proper adjustment of the parts 10, 12, 14 and 16 can be checked periodically, and corrected, if necessary, during curing of the cement.

The retroreflector can of course be reversed end-for-end in this test, so that the roof reflector 10, 12 would be under the autocollimator and reflector 16 would be opposite reflector 24. Reflector 26 could be formed on the upper surface of member 18, extended in length to provide the same length as that of assembled members 18 and 20. In that case the upper and lower faces of member 18 would have to be accurately parallel, a requirement that is avoided in the described embodiment.

What is claimed is:

1. The method of testing large retroreflectors ideally having three reflectors in mutually perpendicular planes such as lateral transfer retroreflectors, including the steps of directing the beam of an error detector toward one reflector of the retroreflector as an incoming beam so that a portion thereof reaches the one reflector without obstruction and so as to produce an outgoing beam separated by a substantial lateral transfer distance from the incoming beam, fixing first and second optically flat test reflectors relative to each other so that they face precisely opposite directions and are off-set from each other by approximately said lateral transfer distance, disposing said first test reflector in position to intercept and reflect only a part of the beam of the error detector and to direct that part of the reflected beam into the error detector, and disposing the second test reflector in position to reflect the outgoing beam of the retroreflector back into the retroreflector, and in the error detector comparing the outgoing light of the error detector as reflected by the first test reflector with the outgoing light of the error detector as it returns from the retroreflector after entry into the retroreflector, departure from the retroreflector, reflection into the retroreflector by said second test reflector, and departure from the retroreflector via said one reflector thereof.

2. The method of testing large retroreflectors in accordance with claim 1, including the further steps of forming said first and second optically flat test reflectors as separate plates having respective reflecting areas and having areas extending from and coplanar with the respective reflecting areas thereof, and assembling said plates with said extending areas against one another and with said reflecting areas exposed and accordingly facing in opposite directions.

3. The method of testing large retroreflectors in accordance with claim 2 wherein the beams leaving said error detector and the retroreflector and incident on said first and second test reflectors are directed along paths in air only.

4. The method of testing large retroreflectors in accordance with claim 1, further including the step of adjusting the reflectors of the retroreflector in relation to one another toward their ideal relationship as indicated by said comparison in the error detector between the light reflected by the first test reflector and the doubly retroreflected light as aforesaid.

5. The method in accordance with claim 1, wherein said error detector is an autocollimator having a target and a reticle and wherein the step of comparing light returned to the error detector includes comparing the location of the image produced at the reticle of the autocollimator as a result of projection of light from the target of the autocollimator to the first test reflector with the location of the image or images of the target at the reticle of the autocollimator resulting from the light from the autocollimator incident at the retroreflector and doubly retroreflected thereby and by the second test reflector as aforesaid.

6. The method of testing large retroreflectors in accordance with claim 1, wherein the off-set distance between the incoming beam and the outgoing beam is enormous compared with the aperture of the error detector.

7. The method of testing large retroreflectors in accordance with claim 1, wherein said beam of the error detector directed at said one reflector of the retroreflector is directed along a path by-passing said first test reflector.

8. A reflector useful in testing retroreflectors, including first and second plates having flat faces, portions of said flat faces being exposed to air and being reflective in a substantial degree and other portions thereof being disposed in face-to-face contact so that said reflective portions which are exposed to air are in the same plane and face precisely opposite directions.

* * * * *